June 12, 1934.　　　H. WILLSHAW ET AL　　　1,962,630
APPARATUS FOR DIVIDING MATERIAL COMPOSED
OF, OR CONTAINING RUBBER, OR THE LIKE
Filed Dec. 14, 1932　　　3 Sheets-Sheet 1
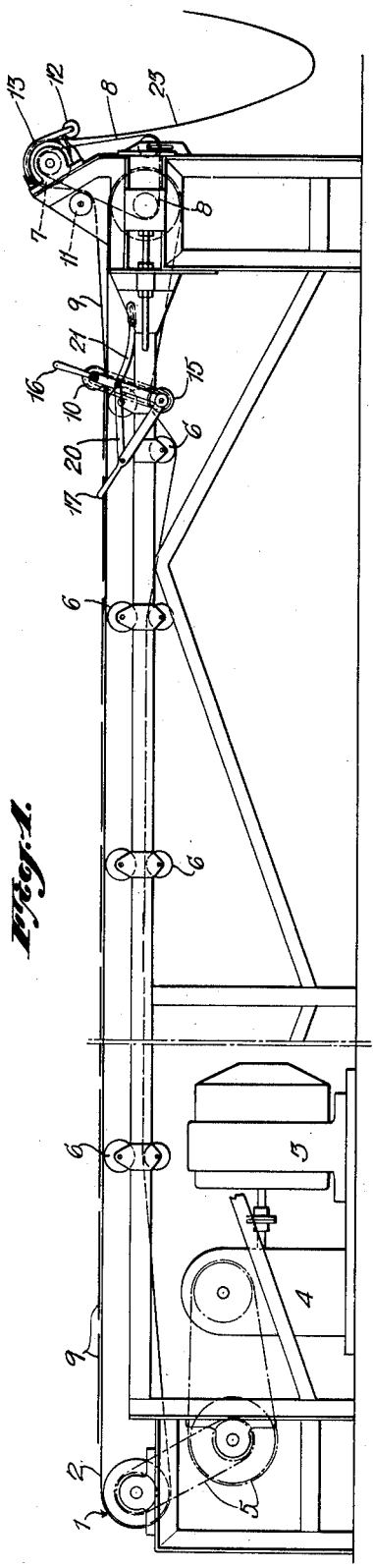
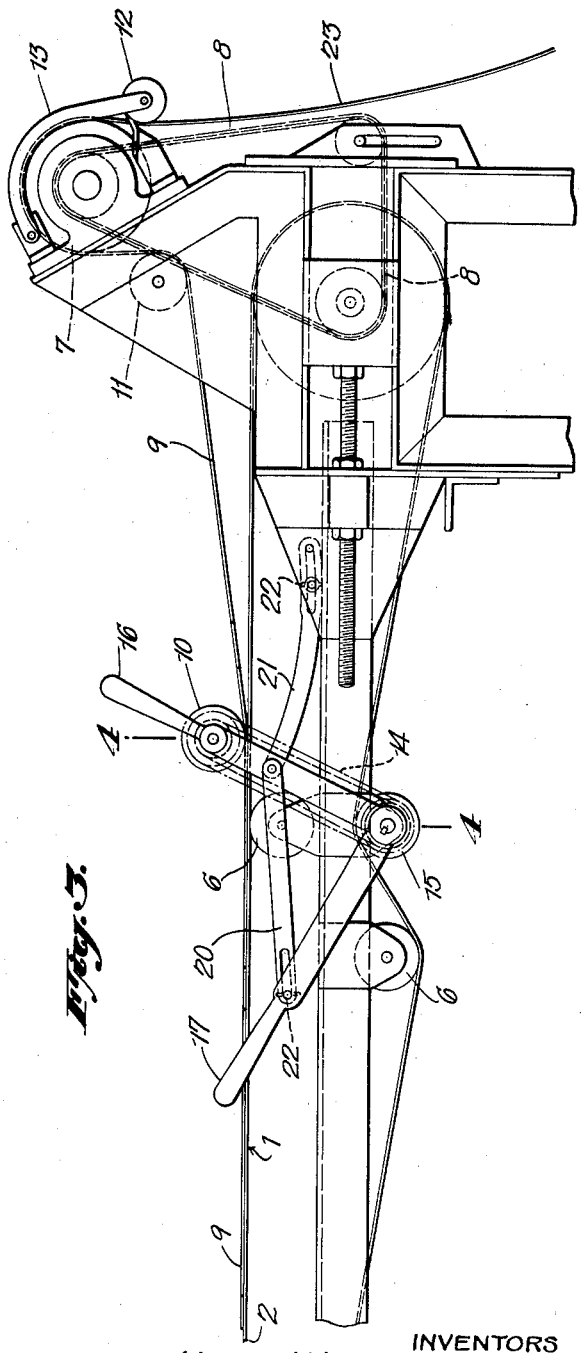
INVENTORS
HARRY WILLSHAW.
HAROLD SMITH
FRANK ARTHUR DAVENPORT.
BY
ATTORNEYS

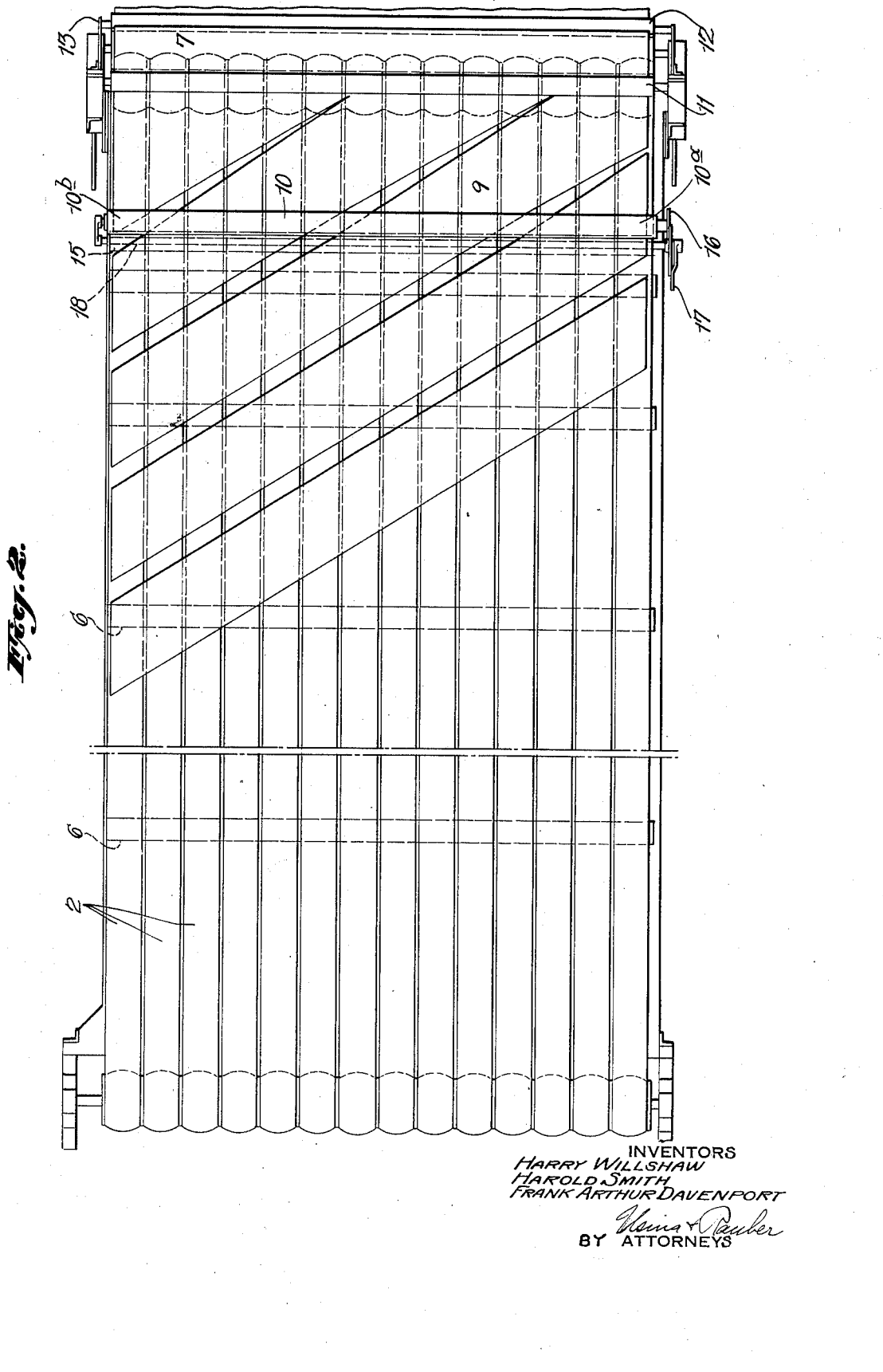

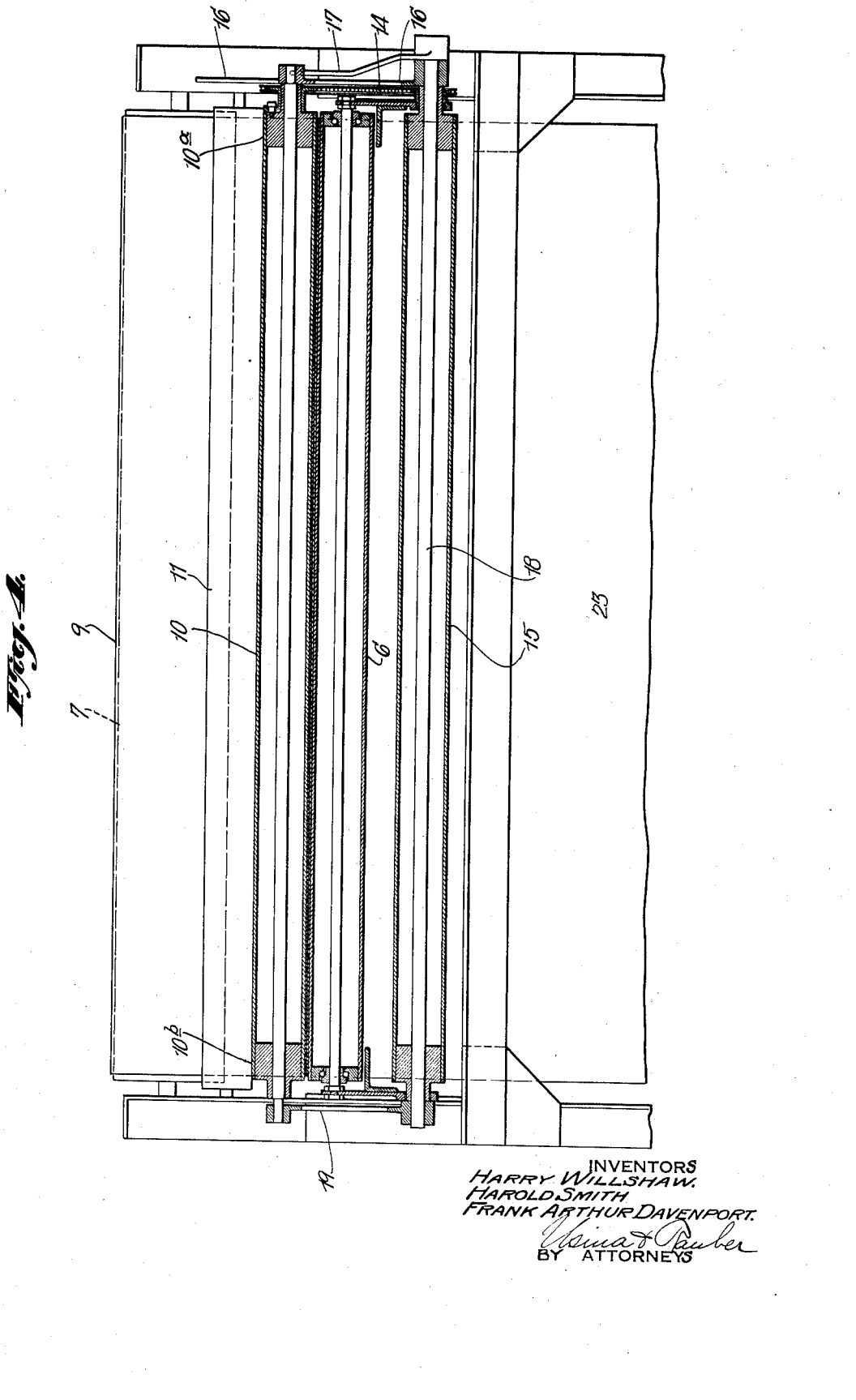

Patented June 12, 1934

1,962,630

UNITED STATES PATENT OFFICE 1,962,630

APPARATUS FOR DIVIDING MATERIAL COMPOSED OF, OR CONTAINING RUBBER, OR THE LIKE

Harry Willshaw, Wylde Green, and Harold Smith and Frank Arthur Davenport, Birmingham, England, assignors to Dunlop Tire and Rubber Corporation, Buffalo, N. Y., a corporation of New York Application December 14, 1932, Serial No. 647,142 In Great Britain December 29, 1931

4 Claims. (Cl. 164—34)

This invention relates to the cutting of sheet material into strips; particularly bias cut strips for providing the carcasses of pneumatic tires.

Thus we use the term "sheet material" to mean any sheet or web-like material, but particularly textile or the like material treated with rubber or the like; the term "strips" we use to designate any pieces cut from such material but particularly such strips as are suitable for use as the plies of pneumatic tire carcasses; by the term "bias" we refer to the cutting of such sheet material at any angle other than a right angle to its edges, but particularly the angles at which the plies of the carcasses of pneumatic tires are cut; and by the term "cut" we mean any form of severance, either complete or partial, but particularly the partial severance used in producing the plies referred to as hereinafter set out.

In some instances the material is not cut right through but moves from the cutter as a sheet of lightly adhering strips which it has hitherto been the practice to tear or pull apart by hand.

An object of the present invention is to effect such final separation mechanically, preferably in continuity with the operation of the cutter.

According to this invention, therefore, strips of previously cut sheet material are completely separated one from the other by causing a sheet of said strips to pass from a moving conveying surface to a surface moving at a higher speed, the preferred arrangement comprising respective rollers and/or conveyors running at different speeds and spaced apart so that the strips are pulled in advancing from one to another.

The mechanism providing the aforesaid relative movement is preferably operated by power means, but it may also be operated manually, the term "mechanically" being used to distinguish from mere manual pulling or tearing apart as hitherto.

Various other features and provisions of our invention will become apparent as the description proceeds.

In order that our invention may be more clearly understood and readily carried into effect, the same will now be described with reference to the accompanying drawings, in which—

Fig. 1 is a side view of one form of apparatus incorporating the provisions of this invention.

Fig. 2 is a plan view thereof.

Fig. 3 is an enlarged side view of part of the same.

Fig. 4 is a part end view of the same in section on the line 4—4 in Fig. 3.

The apparatus shown in the drawings comprises a conveyor 1 composed of a number of separate endless belts 2 commonly driven from a motor 3, reduction gear 4 and chain gearing 5, said conveyor being supported at intervals by a series of idler rollers 6.

A sheet of cut strips is fed to one end of the conveyor from a roller 7 driven from said conveyor by chain gearing 8, said roller having a surface speed less than that of the conveyor 1. Thus the conveyor exerts a pulling effect on the strips 9 of the sheet material as the latter passes to the conveyor belts, provided the grip of the strips on said conveyor is sufficient.

To ensure inter alia that said material does, in fact, get a good grip on the conveyor, we provide a roller 10 between which and the said conveyor the material is definitely nipped so that that part of it 9 extending between the rollers 7 and 10 is submitted to a positive pull.

The material being simply a sheet of separate fabric strips adhering by a thin film of rubber, the effect is to tear the latter and so separate the strips one from the other and to lay them continuously side by side in separation on the conveyor as shown in Fig. 2.

To increase the contact of the sheet with the roller 7, idler rollers 11 and 12 are provided, the roller 11 remaining permanently in the position shown while the roller 12 may be swung into and out of position as the occasion demands on the pivotal arms 13.

So that the roller 10 may rotate without slip at a surface speed equal to that of the conveyor 1, which is obviously desirable, said roller is driven from said conveyor by chain gearing 14 from a roller 15 driven by the underside of the conveyor which is deflected, as shown, so as to get a good grip on said roller 15.

Provision may be made whereby the roller 10 co-acts with the conveyor differently at different points along the length of the roller—for example, whereby the leading part of each strip is submitted to a greater pressure than the following part, an arrangement which we have found to be desirable in practice.

The effort required to pull the strips apart is not always uniform from side to side and again, because the strips engage the conveyor obliquely, there is sometimes a tendency for them to be pulled obliquely across the conveyor instead of straight along it. The provisions referred to in the next preceding paragraph neutralize such effects as these.

As shown particularly in Figs. 3 and 4, such provisions comprise a pair of levers 16 and 17, the lever 16 connecting directly with one end 10a of the roller 10, Figs. 2 and 4, while the lever 17 connects with the opposite end 10b of said roller through a spindle 18 and a link 19. The spindle 18 passes through the centre of the roller 15, but this is merely a matter of convenience of design.

Locking or anchoring links 20 and 21 are provided, the link 20 locking the two levers together while the link 21 locks the lever 16 to a stationary part of the framework of the apparatus, said links being slotted, as shown in Fig. 3, to accommodate the necessary movement of said links, locking being effected by thumb screws 22.

In operation, the movement of the lever 16 will alter the relationship of the near end 10a of the roller with the conveyor without altering the far end 10b to any appreciable extent. Conversely, on operation of the lever 17 the reverse will be the case.

Thus the pressure between the roller 10 and the conveyor may be varied at will differentially across the conveyor, a little manipulation of the two levers or of one in relation to the other putting the said roller into the required relationship with the conveyor, the screws 22 being tightened up to fix the system in the position arrived at.

The cutter from which the sheet of adhering fabric strips comes as a loop or festoon 23 is not shown in the drawings—it may be of well known kind. The roller 7 runs continuously while the fabric comes from the cutter intermittently as strip after strip is cut, the difference in the two effects being accommodated by the said festoon.

In the above we have referred to one embodiment of our invention which, in practice, we have found to be most successful, but it should be understood that we do not confine ourselves to that particular embodiment as it will be apparent that our said invention may be carried into effect, or the embodiment herein given may be modified in a number of different ways without departing from the spirit of our said invention as defined in the appended claims.

What we claim is—

1. A method of separating bias cut strips from sheet material which comprises passing said sheet of material lengthwise in contact with a moving surface, taking said sheet from said surface into engagement with a surface moving at a higher speed, and engaging said sheet with said higher speed surface with pressure graduated from one side of said sheet to the other.

2. Apparatus for separating bias cut strips from sheet material, which comprises a movable sheet supporting surface, a conveyor below, and positioned to receive said sheet material from said first surface, means for moving said conveyor at a speed proportioned to and faster than that of said surface, a roller transverse to said conveyor for pressing said sheet onto said conveyor, means for rotating said roller at the same surface speed as said conveyor, and means for graduating the pressure of said roller on said conveyor.

3. Apparatus for separating bias cut strips from sheet material, which comprises a movable sheet supporting surface, a conveyor below, and positioned to receive said sheet material from said first surface, means for moving said conveyor at a speed proportioned to and faster than that of said surface, a roller transverse to said conveyor for pressing said sheet onto said conveyor, means for rotating said roller at the same surface speed as said conveyor, and an idler roller for directing said sheet from said surface onto said conveyor.

4. Apparatus for separating bias cut strips from sheet material which comprises a conveyor, means moving with the same surface speed to press sheet material against said conveyor, and a conveyor having its delivery end overlapping the receiving end of said first conveyor and delivering thereto immediately in advance of said pressing means.

HARRY WILLSHAW.
HAROLD SMITH.
FRANK ARTHUR DAVENPORT.